US012644299B2

(12) United States Patent
Tothfalusi

(10) Patent No.: US 12,644,299 B2
(45) Date of Patent: Jun. 2, 2026

(54) SWIMMING POOL BACKWASH FILTRATION DEVICE

(71) Applicant: Alexander Tothfalusi, Mount Brydges (CA)

(72) Inventor: Alexander Tothfalusi, Mount Brydges (CA)

( * ) Notice: Subject to any disclaimer, the term of this patent is extended or adjusted under 35 U.S.C. 154(b) by 534 days.

(21) Appl. No.: 18/201,247

(22) Filed: May 24, 2023

(65) Prior Publication Data

US 2023/0366228 A1    Nov. 16, 2023

Related U.S. Application Data

(63) Continuation-in-part of application No. 17/742,555, filed on May 12, 2022, now abandoned.

(51) Int. Cl.
*E04H 4/12* (2006.01)
*B01D 29/15* (2006.01)

(52) U.S. Cl.
CPC ........... *E04H 4/1209* (2013.01); *B01D 29/15* (2013.01)

(58) Field of Classification Search
CPC .............................. E04H 4/1209; B01D 29/15
USPC ............ 210/671, 94, 167.1, 167.12, 167.13, 210/416.1, 416.2, 435, 446, 450, 455, 210/493.2, 258
See application file for complete search history.

(56) References Cited

U.S. PATENT DOCUMENTS

| | | | |
|---|---|---|---|
| 3,954,621 A | 5/1976 | Etani | |
| 4,759,842 A * | 7/1988 | Frees ..................... | B01D 35/02 210/453 |
| 5,211,846 A | 5/1993 | Kott | |
| 5,505,844 A * | 4/1996 | Porter ................ | B01D 24/4642 210/167.13 |
| D476,058 S | 6/2003 | Norton | |
| 7,032,760 B2 | 4/2006 | Walton | |
| 7,815,796 B2 | 10/2010 | Nibler | |
| 8,545,682 B2 | 10/2013 | Jones | |
| 2019/0388807 A1 | 12/2019 | van der Meijden | |

FOREIGN PATENT DOCUMENTS

WO    WO2004103912    12/2004

* cited by examiner

*Primary Examiner* — Madeline Gonzalez

(57) ABSTRACT

A pool backwash secondary filtration assembly for filtering water from a pool for reuse includes a housing, which is cylindrical and which has a first end that is open. A tubular filter is positionable within the housing and an endcap is selectively attachable to the housing to close the first end. A biaser attached to the endcap biases a plug into the tubular filter upon attachment of the endcap to the housing and the tubular filter is sealingly engaged to a second end of the housing. First and second connectors are attached to the endcap and to the second end of the housing, respectively, and are attachable to a first and second conduits, respectively, which extend from a primary filtration device and a pool, respectively. Water that is pumped from the pool through the primary filtration device thus passes through the tubular filter prior to reentering the pool.

12 Claims, 10 Drawing Sheets

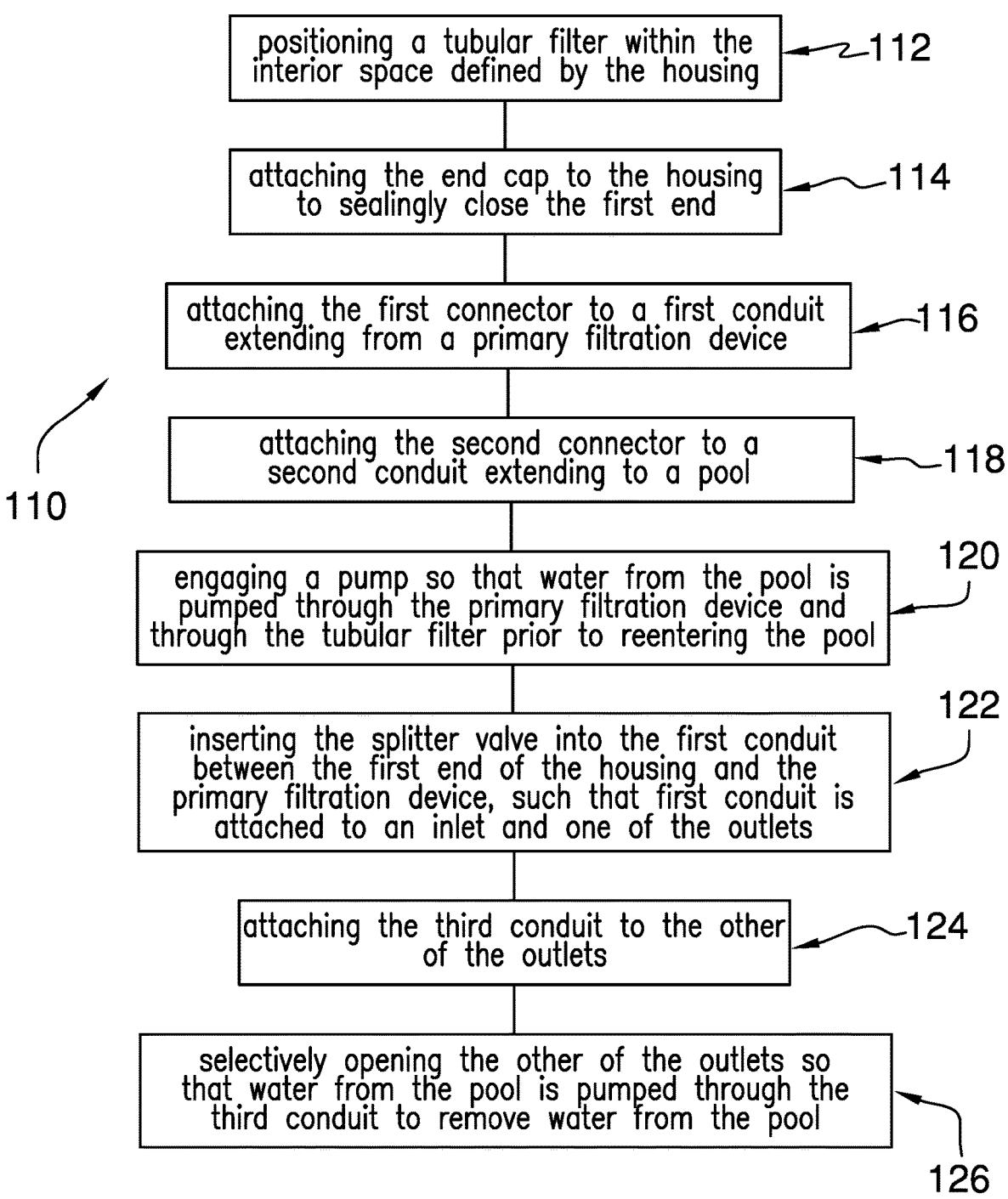

positioning a tubular filter within the interior space defined by the housing  ⟵112 attaching the end cap to the housing to sealingly close the first end  ⟵114 attaching the first connector to a first conduit extending from a primary filtration device  ⟵116 attaching the second connector to a second conduit extending to a pool  ⟵118 engaging a pump so that water from the pool is pumped through the primary filtration device and through the tubular filter prior to reentering the pool  120 inserting the splitter valve into the first conduit between the first end of the housing and the primary filtration device, such that first conduit is attached to an inlet and one of the outlets  122 attaching the third conduit to the other of the outlets  ⟵124 selectively opening the other of the outlets so that water from the pool is pumped through the third conduit to remove water from the pool  126

SWIMMING POOL BACKWASH FILTRATION DEVICE

CROSS-REFERENCE TO RELATED APPLICATIONS

I hereby claim the benefit under 35 U.S.C., Section 120 Continuation-In-Part of U.S. application Ser. No. 17/742, 555 filed on May 12, 2022.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to secondary filtration assemblies and more particularly pertains to a new secondary filtration assembly for filtering water from a pool for reuse. Primary filtration assemblies for filtering pool water often fail to remove fine particulates.

(2) Description of Related Art Including Information Disclosed Under 37 CFR 1.97 and 1.98

The prior art relates to secondary filtration assemblies. While primary filtration assemblies for filtering pool water are known in the prior art, the prior art does not teach a secondary filtration assembly configured to fine filter the backwash from a swimming pool, thus recycling the pool water for further use.

BRIEF SUMMARY OF THE INVENTION

An embodiment of the disclosure meets the needs presented above by generally comprising a housing, which is cylindrical and which defines an interior space. A first end of the housing is open so that a tubular filter is positionable within the interior space. An endcap is selectively attachable to the housing to sealingly close the first end. A biaser is attached to an inner face of the endcap. A plug, which is attached to the biaser distal from the endcap, is configured for insertion into a first terminus of the tubular filter upon attachment of the endcap to the housing. The first terminus thus is plugged and a second terminus of the tubular filter is sealingly engaged to a second end of the housing. A first connector is attached to the endcap and is configured to be attached to a first conduit that extends from a primary filtration device. The primary filtration device thus is in fluidic communication with the interior space. A second connector is attached to the second end of the housing and is configured to be attached to a second conduit that extends to a pool. An internal space of the tubular filter thus is in fluidic communication with the pool. Water that is pumped from the pool through the primary filtration device thus passes through the tubular filter prior to reentering the pool.

Another embodiment of the disclosure includes a method of filtering backwash from a pool. Steps of the method comprise positioning a tubular filter within the housing, attaching the endcap attaching the first and second connectors to the first and second conduits, respectively, and engaging a pump so that water from the pool is pumped through the primary filtration device and through the tubular filter prior to reentering the pool.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 11 is a flow diagram for a method utilizing an embodiment of the disclosure.

DETAILED DESCRIPTION OF THE INVENTION

Figure 1:
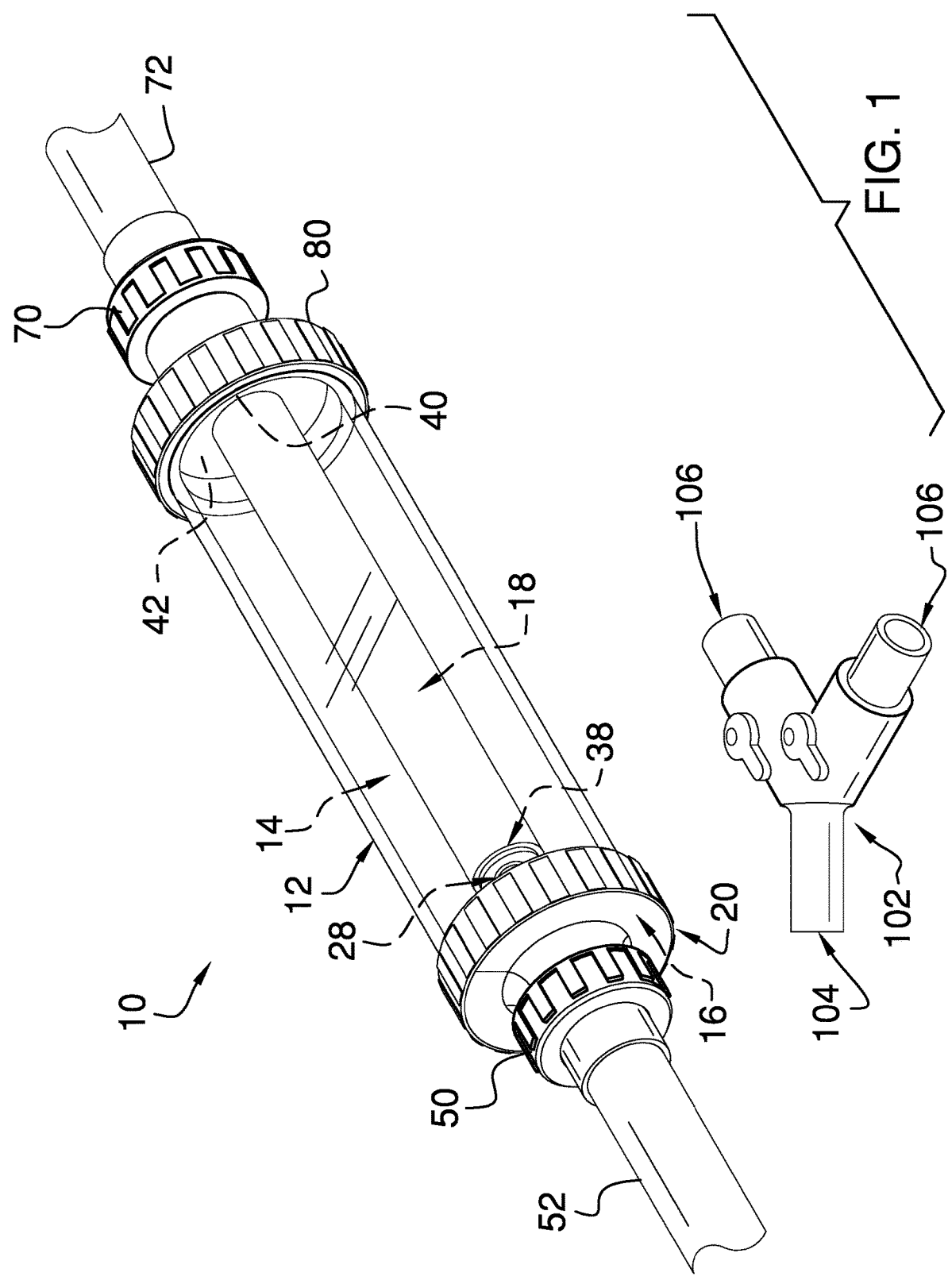
FIG. 1 is an isometric perspective view of a pool backwash secondary filtration assembly according to an embodiment of the disclosure.
Figure 2:
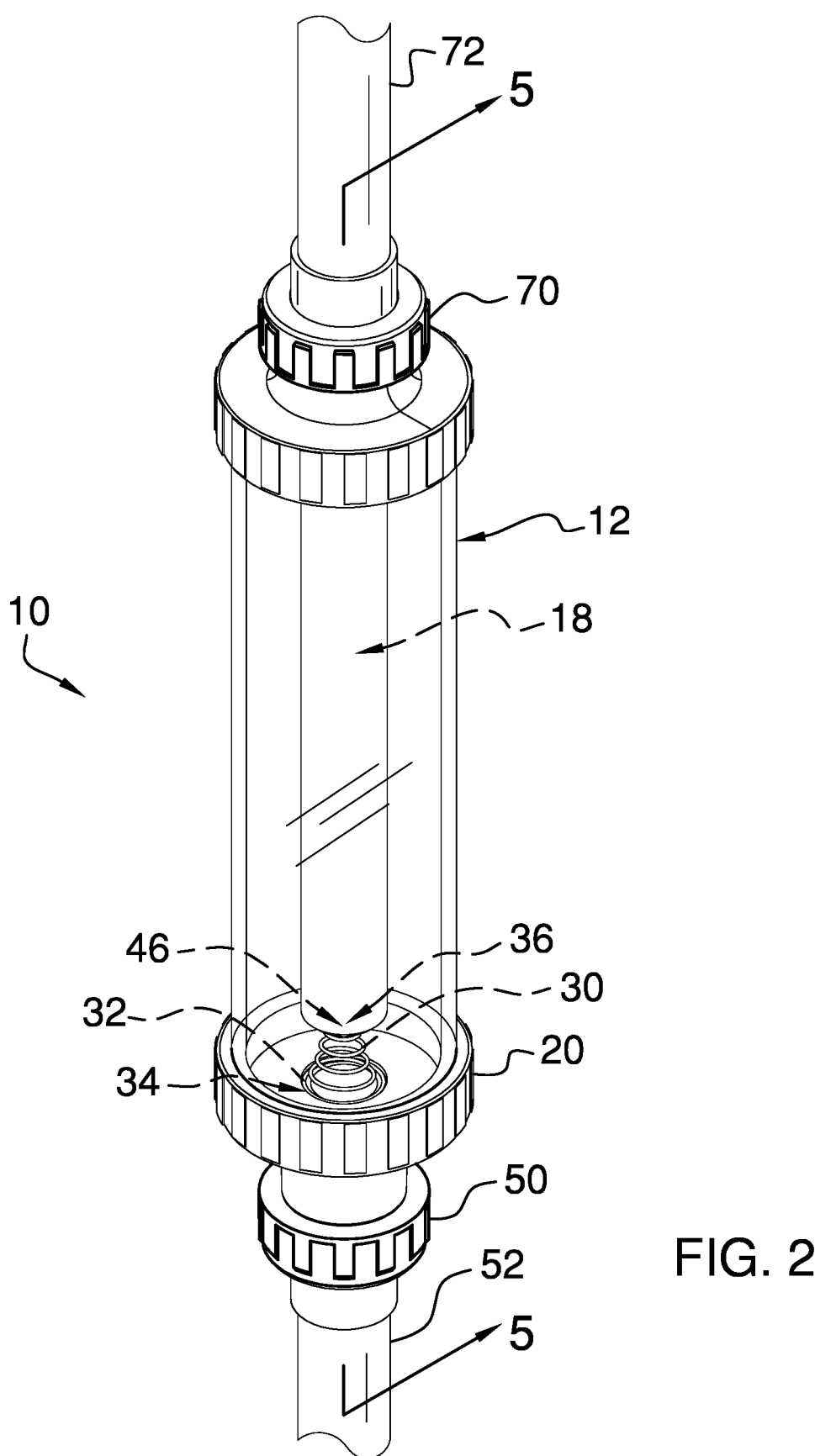
FIG. 2 is an isometric perspective view of an embodiment of the disclosure.
Figure 3:
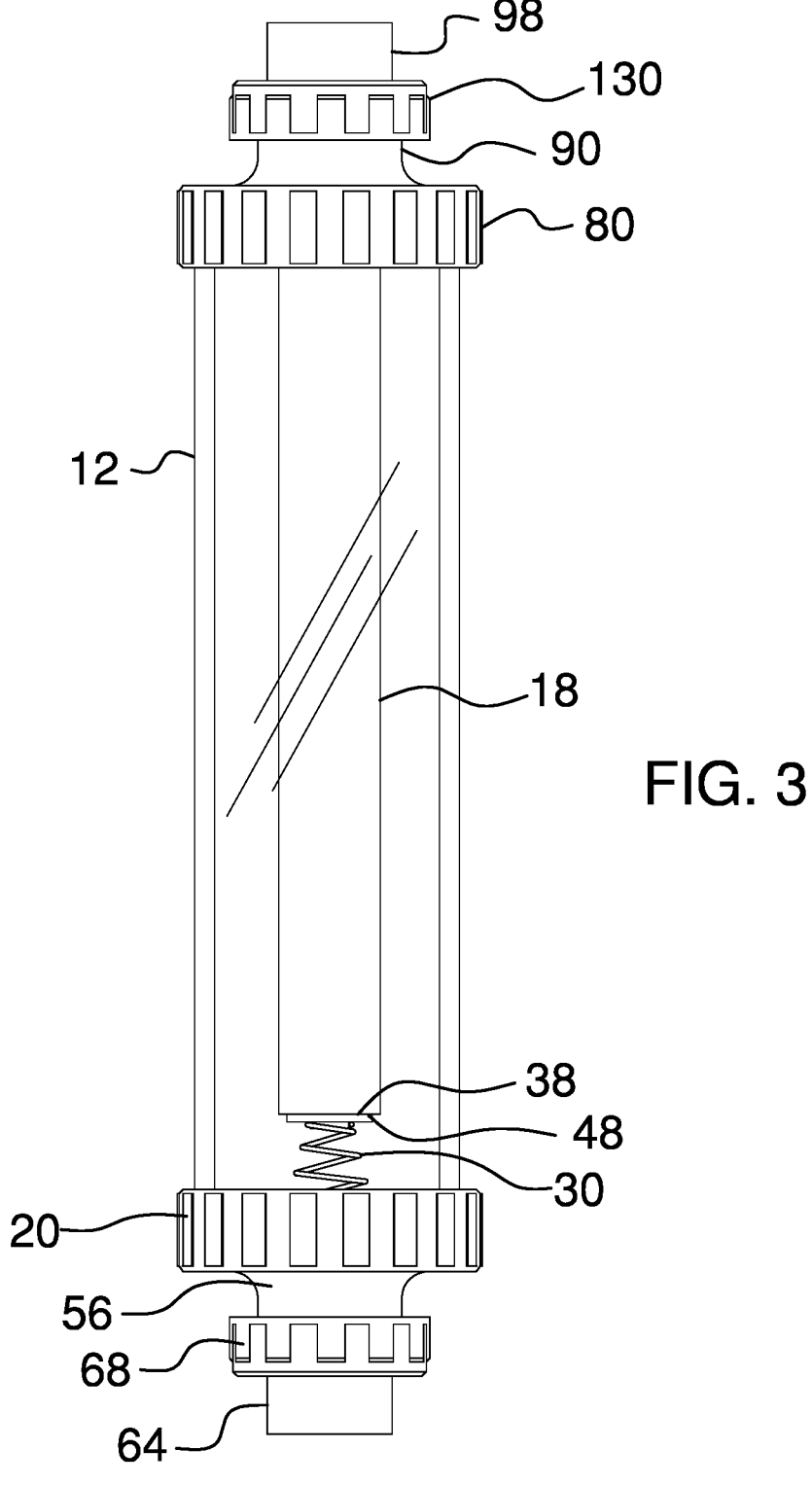
FIG. 3 is a side view of an embodiment of the disclosure.

With reference now to the drawings, and in particular to FIGS. 1 through 11 thereof, a new secondary filtration assembly embodying the principles and concepts of an embodiment of the disclosure and generally designated by the reference numeral 10 will be described.

Figure 4:
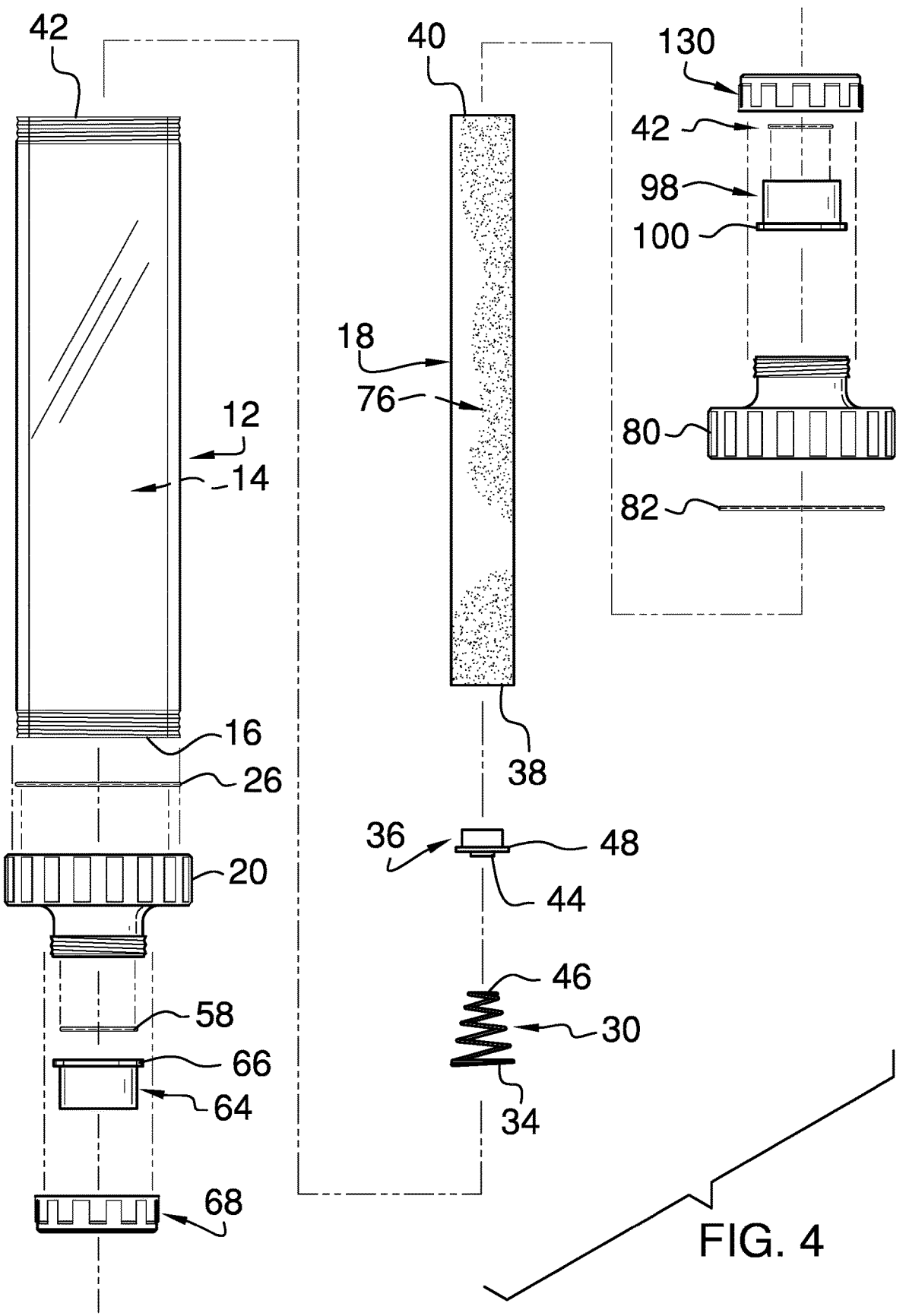
FIG. 4 is an exploded view of an embodiment of the disclosure.
Figure 5:
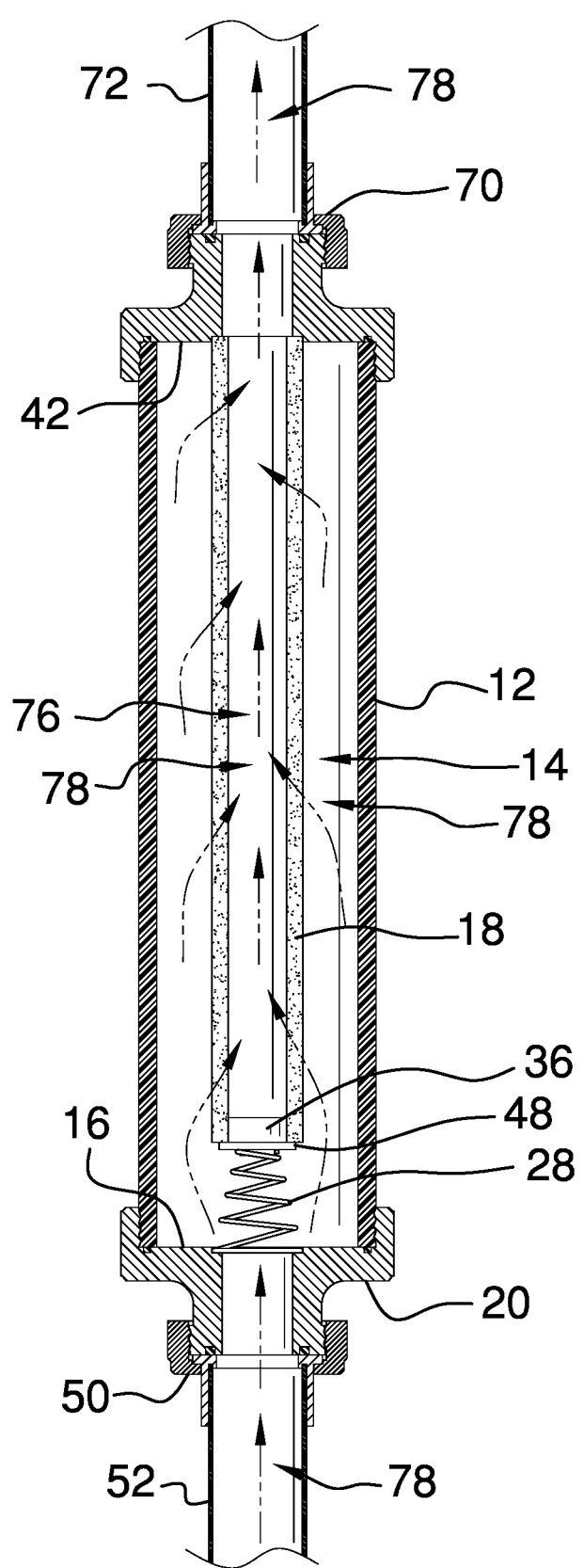
FIG. 5 is a cross-sectional view of an embodiment of the disclosure.
Figure 6:
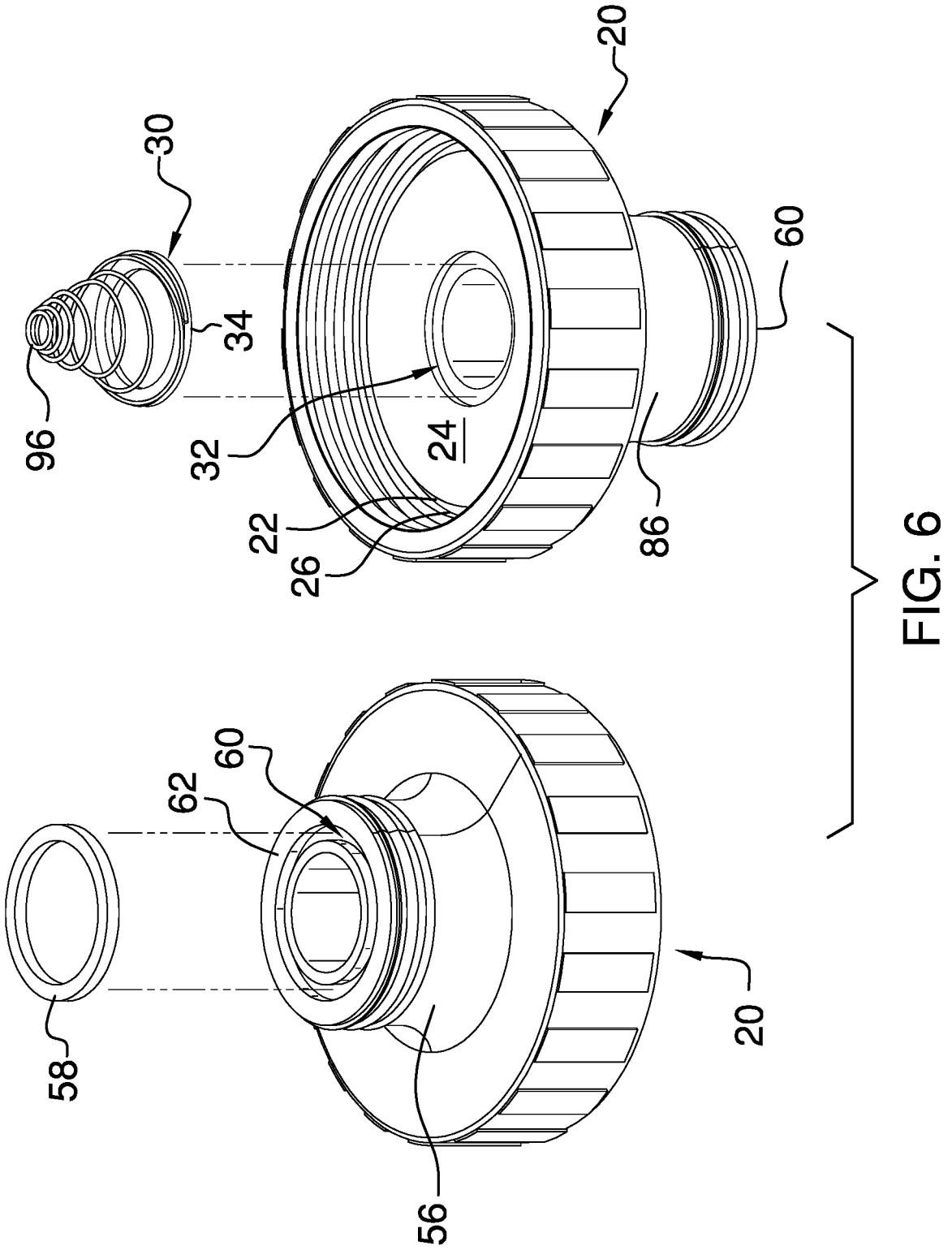
FIG. 6 is a detail view of an embodiment of the disclosure.
Figures 7, 8:
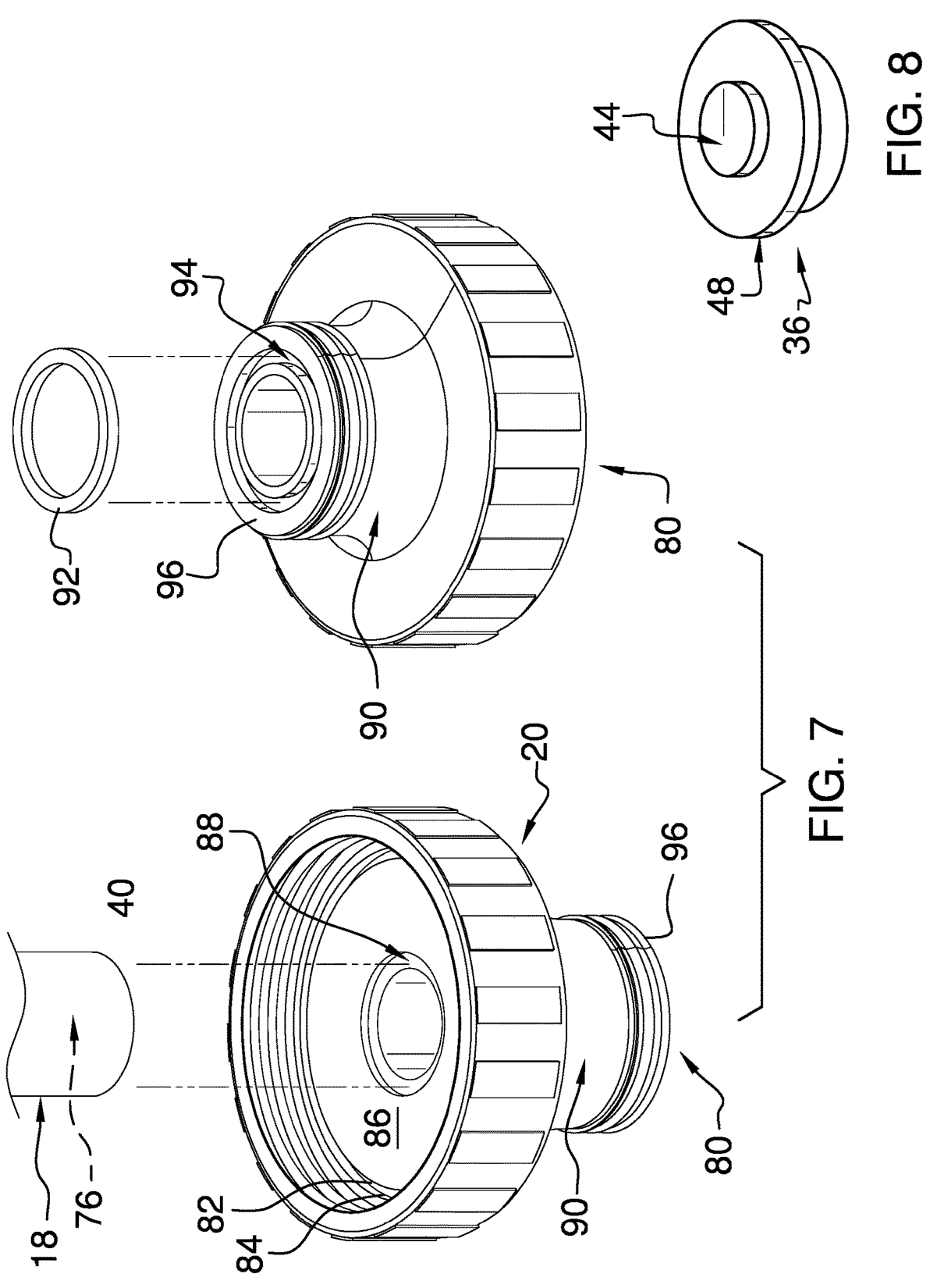
FIG. 7 is a detail view of an embodiment of the disclosure.
FIG. 8 is a detail view of an embodiment of the disclosure.

As best illustrated in FIGS. 1 through 11, the pool backwash secondary filtration assembly 10 generally comprises a housing 12, which is cylindrical and which defines an interior space 14. The housing 12 may comprise clear plastic or glass and thus be substantially transparent. A first end 16 of the housing 12 is open so that a tubular filter 18 is positionable within the interior space 14. An endcap 20 is selectively attachable to the housing 12 to sealingly close the first end 16. The housing 12 is externally threaded adjacent to the first end 16 and the endcap 20 is internally threaded. Thus, the endcap 20 is threadedly couplable to the first end 16 of the housing 12, as is shown in FIG. 4. A cap indent 22 extends into an inner face 24 of the endcap 20, as is shown in FIG. 6. A cap gasket 26 is positioned in the cap indent 22 and is compressed between the endcap 20 and the first end 16 of the housing 12 upon threaded attachment of the endcap 20 to the housing 12. The endcap 20 thus is sealingly attached to the housing 12. The present invention also anticipates the endcap 20 being attachable to the housing 12 by other attachment means, such as, but not limited to, internal threads on the housing 12 and external threads on the endcap 20, clamps, or the like.

A biaser 28 is attached to the inner face 24 of the endcap 20. The biaser 28 comprises a spring 30 or other biasing means, such as, but not limited to, selectively extensible rods, screw fittings, or the like. The endcap 20 has a recess 32 extending into its inner face 24 to receive a first endpoint 34 of the spring 30. A plug 36, which is attached to the biaser 28 distal from the endcap 20, is configured for insertion into a first terminus 38 of the tubular filter 18 upon attachment of the endcap 20 to the housing 12, as is shown in FIG. 4. The first terminus 38 thus is plugged and a second terminus 40 of the tubular filter 18 is sealingly engaged to a second end 42 of the housing 12. A cylinder 44, which is attached to and which extends from the plug 36, is insertable into a second endpoint 46 of the spring 30. The recess 32 and the cylinder 44 serve to retain the spring 30 an operable position between the endcap 20 and the tubular filter 18. A stop flange 48, which is attached to and extends radially from the plug 36, is configured to abut the first terminus 38 of the tubular filter 18. The stop flange 48 prevents the plug 36 from completely entering the tubular filter 18, which could allow the second terminus 40 of the tubular filter 18 to disengage from the second end 42 of the housing 12.

A first connector 50 is attached to the endcap 20 and is configured to be attached to a first conduit 52 that extends from a primary filtration device 54. The primary filtration device 54 thus is in fluidic communication with the interior space 14. The first connector 50 may comprise a first pipe 56, which is attached to and extends from the endcap 20 and which is externally threaded distal from the endcap 20. A first O-ring 58 is positioned in a first indent 60 that is positioned in a terminus 62 of the first pipe 56 distal from the endcap 20. A first connecting pipe 64 is selectively couplable to the first conduit 52. A first flange 66 is attached to and extends radially from the first connecting pipe 64. The first connecting pipe 64 is insertable into a first cap nut 68. The first cap nut 68 sealingly engages the first flange 66 to the first O-ring 58 upon threaded coupling of the first cap nut 68 to the first pipe 56. The first conduit 52 thus is in fluidic communication with the interior space 14. The present invention also anticipates the first connector 50 comprising other connecting means, such as, but not limited to, quick-connects, threaded hose connections, or the like.

A second connector 70 is attached to the second end 42 of the housing 12 and is configured to be attached to a second conduit 72 that extends to a pool 74. An internal space 76 of the tubular filter 18 thus is in fluidic communication with the pool 74. Water 78 that is pumped from the pool 74 through the primary filtration device 54 thus passes through the tubular filter 18 prior to reentering the pool 74. The tubular filter 18 removes particulates from the water 74 that are too small to be retained by the primary filtration device 54, thereby purifying the water 74 to a level that cannot be achieved with the primary filtration device 54 alone.

The second end 42 of the housing 12 also may be open and the housing 12 may be externally threaded adjacent to its second end 42. A cap 80, which is internally threaded, is threadedly couplable to the second end 42 of the housing 12 to sealingly close the second end 42. A lid gasket 82 is positioned in a lid indent 84 that extends into an inner facet 86 of the cap 80. The lid gasket 82 is compressed between the cap 80 and the second end 42 of the housing 12 upon threaded attachment of the cap 80 to the housing 12. A circular indent 88 extends into the inner facet 86 of the cap 80 and is configured to seat the second terminus 40 of the tubular filter 18. The present invention also anticipates the cap 80 being attachable to the housing 12 by other attachment means, such as, but not limited to, internal threads on the housing 12 and external threads on the cap 80, clamps, or the like.

The second connector 70 may comprise a second pipe 90, which is attached to and extends from the cap 80 and which is externally threaded distal from the cap 80. A second O-ring 92 is positioned in a second indent 94, which is positioned in a terminus 96 of the second pipe 90 distal from the cap 80. A second connecting pipe 98 is selectively couplable to the second conduit 72. A second flange 100 is attached to and extends radially from the second connecting pipe 98. A second cap nut 130, into which the second connecting pipe 98 is insertable, sealingly engages the second flange 100 to the second O-ring 92 upon threaded coupling of the second cap nut 130 to the second pipe 90. The second conduit 72 thus is in fluidic communication with the internal space 76 of the tubular filter 18. The present invention also anticipates the second connector 70 comprising other connecting means, such as, but not limited to, quick-connects, threaded hose connections, or the like.

As described herein, the endcap 20 and the cap 80 are identical and interchangeable. However, other configurations of the pool backwash secondary filtration assembly 10 are anticipated by the present invention. In one example, both the first connector 50 and the second connector 70 may be attached to the endcap 20, with the second end 42 of the housing 12 being closed. In another example, the second end 42 of the housing 12 is closed and the second connector 70 is attached to the second end 42.

Figure 9:
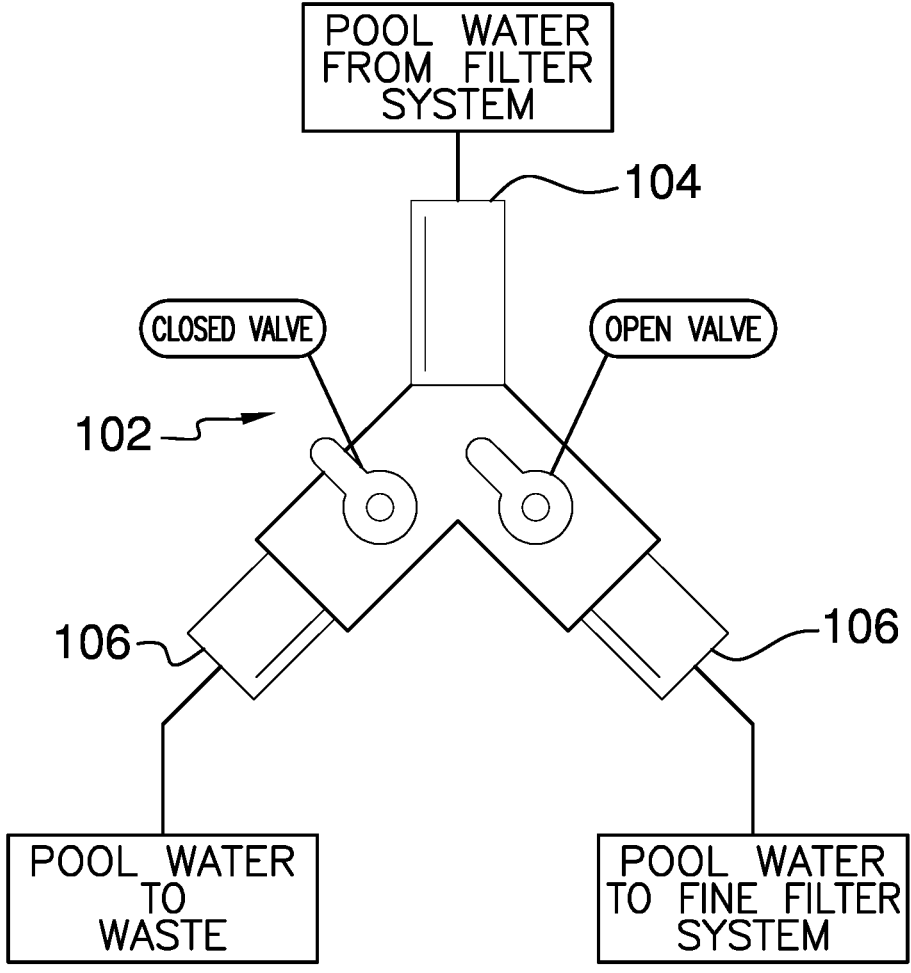
FIG. 9 is a detail view of an embodiment of the disclosure.
Figure 10:
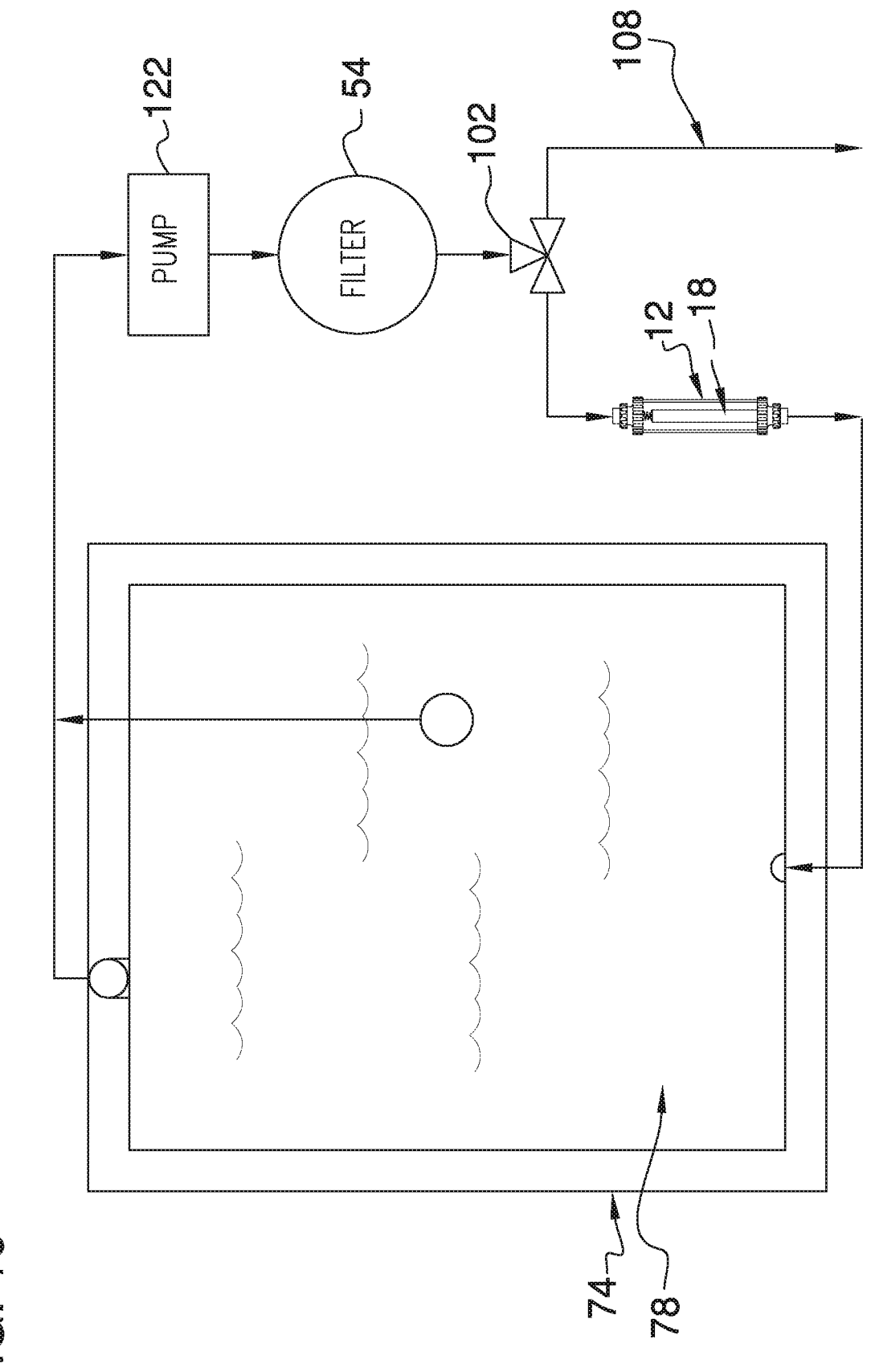
FIG. 10 is an in-use view of an embodiment of the disclosure.

The pool backwash secondary filtration assembly 10 also may comprise a splitter valve 102, as is shown in FIGS. 1, 9, and 10. The splitter valve 102 is configured to be inserted into the first conduit 52 between the first end 16 of the housing 12 and the primary filtration device 54. The first conduit 52 is attached to an inlet 104 and one of the outlets 106 of a pair of outlets 106 of the splitter valve 102. A third conduit 108 is attached to and extends from the other of the outlets 106 so that the pool 74 can be drained through the third conduit 108 upon opening of the other of the outlets 106. The present invention anticipates the splitter valve 102 comprising three-way valves, y-valves, or the like.

In use, the pool backwash secondary filtration assembly 10 enables a method of filtering backwash from a pool 110. The method 110 comprises providing the pool backwash secondary filtration assembly 10, according to the specification above. A first assembly step 112 of the method 110 is positioning a tubular filter 18 within the interior space 14 defined by the housing 12. A second assembly step 114 of the method 110 is attaching the endcap 20 to the housing 12 to sealingly close the first end 16 concurrently with the biaser 28 inserting the plug 36 into the first terminus 38 of the tubular filter 18 and so that the second terminus 40 of the tubular filter 18 is sealingly engaged to the second end 42 of the housing 12. A first attachment step 116 of the method 110 is attaching the first connector 50 to the first conduit 52 extending from the primary filtration device 54 so that the primary filtration device 54 is in fluidic communication with the interior space 14. A second attachment step 118 of the method 110 is attaching the second connector 70 to the second conduit 72 extending to the pool 74 so that the internal space 76 of the tubular filter 18 is in fluidic communication with the pool 74. An operational step 120 of the method 110 is engaging a pump 122 so that water 78 from the pool 74 is pumped through the primary filtration device 54 and through the tubular filter 18 prior to reentering the pool 74.

The method 110 also may comprise providing the splitter valve 102, according to the specification above. A third assembly step 124 of the method 110 entails inserting the splitter valve 102 into the first conduit 52 between the first end 16 of the housing 12 and the primary filtration device 54 so that first conduit 52 is attached to the inlet 104 and one of the outlets 106 of the splitter valve 102. An alternate attachment step 126 of the method 110 is attaching the third conduit 108 to the other of the outlets 106. An alternate operational step 128 of the method 110 is selectively opening the other of the outlets 106 so that water 78 from the pool 74 is pumped through the third conduit 108 to remove water 78 from the pool 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pool backwash secondary filtration assembly comprising:

a housing defining an interior space, the housing being cylindrical and having a first end, the first end being open such that a tubular filter is positionable within the interior space;

an endcap selectively attachable to the housing for sealingly closing the first end;

a biaser attached to an inner face of the endcap;

a plug attached to the biaser distal from the endcap, the plug being configured for insertion into a first terminus of the tubular filter upon attachment of the endcap to the housing, such that the first terminus is plugged and a second terminus of the tubular filter is sealingly engaged to a second end of the housing;

a first connector attached to the endcap and being configured for attaching to a first conduit extending from a primary filtration device, such that the primary filtration device is in fluidic communication with the interior space;

a second connector attached to the second end of the housing and being configured for attaching to a second conduit extending to a pool, such that an internal space of the tubular filter is in fluidic communication with the pool, such that water pumped from the pool through the primary filtration device passes through the tubular filter prior to reentering the pool; and wherein the first connector comprises a first pipe attached to and extending from the endcap, the first pipe being externally threaded distal from the endcap;

a first O-ring positioned in a first indent positioned in a terminus of the first pipe distal from the endcap;

a first connecting pipe selectively couplable to the first conduit;

a first flange attached to and extending radially from the first connecting pipe; and a first cap nut into which the first connecting pipe is insertable, such that the first flange sealingly engages the first O-ring upon threaded coupling of the first cap nut to the first pipe, such that the first conduit is in fluidic communication with the interior space.

2. The pool backwash secondary filtration assembly of claim 1, wherein:

the housing is externally threaded adjacent to the first end; and the endcap is internally threaded, such that the endcap is threadedly couplable to the first end of the housing.

3. The pool backwash secondary filtration assembly of claim 1, wherein the biaser comprises a spring.

4. The pool backwash secondary filtration assembly of claim 3, wherein the endcap has a recess extending into inner face of the endcap for receiving a first endpoint of the spring.

5. The pool backwash secondary filtration assembly of claim 3, further including:

a stop flange attached to and extending radially from the plug, wherein the stop flange is configured to abut the first terminus of the tubular filter; and a cylinder attached to and extending from the plug, such that the cylinder is insertable into a second endpoint of the spring.

6. The pool backwash secondary filtration assembly of claim 1, further including:

a cap indent extending into the inner face of the endcap; and a cap gasket positioned in the cap indent, such that the cap gasket is compressed between the endcap and the first end of the housing upon threaded attachment of the endcap to the housing.

7. The pool backwash secondary filtration assembly of claim 1, further including:

the second end of the housing being open, the housing being externally threaded adjacent to the second end;

a cap, the cap being internally threaded, such that the cap is threadedly couplable to the second end of the housing for sealingly closing the second end; and the second connector comprising:

a second pipe attached to and extending from the cap, the second pipe being externally threaded distal from the cap;

a second O-ring positioned in a second indent positioned in a terminus of the second pipe distal from the cap;

a second connecting pipe selectively couplable to the second conduit;

a second flange attached to and extending radially from the second connecting pipe; and a second cap nut into which the second connecting pipe is insertable, such that the second flange sealingly engages the second O-ring upon threaded coupling of the second cap nut to the second pipe, such that the second conduit is in fluidic communication with the internal space of the tubular filter.

8. The pool backwash secondary filtration assembly of claim 7, further including:

a lid indent extending into an inner facet of the cap; and a lid gasket positioned in the lid indent, such that the lid gasket is compressed between the cap and the second end of the housing upon threaded attachment of the cap to the housing.

9. The pool backwash secondary filtration assembly of claim 7, further including a circular indent extending into an inner facet of the cap, wherein the circular indent is configured for seating the second terminus of the tubular filter.

10. The pool backwash secondary filtration assembly of claim 1, further including:

a splitter valve configured to be inserted into the first conduit between the first end of the housing and the primary filtration device, such that the first conduit is attached to an inlet and one of the outlets of a pair of outlets of the splitter valve; and a third conduit attached to and extending from the other of the outlets of the pair of outlets, such that the pool can be drained through the third conduit upon opening of the other of the outlets.

11. A method of filtering backwash from a pool, the method comprising providing the pool backwash secondary filtration assembly of claim 1, and:

positioning a tubular filter within the interior space defined by the housing;

attaching the endcap to the housing to sealingly close the first end so that the biaser inserts the plug into the first terminus of the tubular filter and so that the second terminus of the tubular filter is sealingly engaged to the second end of the housing;

attaching the first connector to a first conduit extending from a primary filtration device, such that the primary filtration device is in fluidic communication with the interior space;

attaching the second connector to a second conduit extending to a pool, such that an internal space of the tubular filter is in fluidic communication with the pool; and engaging a pump so that water from the pool is pumped through the primary filtration device and through the tubular filter prior to reentering the pool.

12. A pool backwash secondary filtration assembly comprising:

a housing defining an interior space, the housing being cylindrical and having a first end, the first end being open such that a tubular filter is positionable within the interior space, the housing being externally threaded adjacent to the first end, a second end of the housing being open, the housing being externally threaded adjacent to the second end;

an endcap selectively attachable to the housing for sealingly closing the first end, the endcap being internally threaded, such that the endcap is threadedly couplable to the first end of the housing;

a biaser attached to an inner face of the endcap, the biaser comprising a spring, the endcap having a recess extending into the inner face of the endcap for receiving a first endpoint of the spring;

a cap indent extending into the inner face of the endcap;

a cap gasket positioned in the cap indent, such that the cap gasket is compressed between the endcap and the first end of the housing upon threaded attachment of the endcap to the housing;

a plug attached to the biaser distal from the endcap, the plug being configured for insertion into a first terminus of the tubular filter upon attachment of the endcap to the housing, such that the first terminus is plugged and a second terminus of the tubular filter is sealingly engaged to the second end of the housing;

a stop flange attached to and extending radially from the plug, wherein the stop flange is configured to abut the first terminus of the tubular filter;

a cylinder attached to and extending from the plug, such that the cylinder is insertable into a second endpoint of the spring;

a first connector attached to the endcap and being configured for attaching to a first conduit extending from a primary filtration device, such that the primary filtration device is in fluidic communication with the interior space, the first connector comprising:

a first pipe attached to and extending from the endcap, the first pipe being externally threaded distal from the endcap;

a first O-ring positioned in a first indent positioned in a terminus of the first pipe distal from the endcap;

a first connecting pipe selectively couplable to the first conduit;

a first flange attached to and extending radially from the first connecting pipe; and a first cap nut into which the first connecting pipe is insertable, such that the first flange sealingly engages the first O-ring upon threaded coupling of the first cap nut to the first pipe, such that the first conduit is in fluidic communication with the interior space;

a second connector attached to the second end of the housing and being configured for attaching to a second conduit extending to a pool, such that an internal space of the tubular filter is in fluidic communication with the pool, such that water pumped from the pool through the primary filtration device passes through the tubular filter prior to reentering the pool;

a cap, the cap being internally threaded, such that the cap is threadedly couplable to the second end of the housing for sealingly closing the second end;

a lid indent extending into an inner facet of the cap;

a lid gasket positioned in the lid indent, such that the lid gasket is compressed between the cap and the second end of the housing upon threaded attachment of the cap to the housing;

a circular indent extending into the inner facet of the cap, wherein the circular indent is configured for seating the second terminus of the tubular filter;

the second connector comprising:

a second pipe attached to and extending from the cap, the second pipe being externally threaded distal from the cap;

a second O-ring positioned in a second indent positioned in a terminus of the second pipe distal from the cap;

a second connecting pipe selectively couplable to the second conduit;

a second flange attached to and extending radially from the second connecting pipe; and a second cap nut into which the second connecting pipe is insertable, such that the second flange sealingly engages the second O-ring upon threaded coupling of the second cap nut to the second pipe, such that the second conduit is in fluidic communication with the internal space of the tubular filter; and a splitter valve configured to be inserted into the first conduit between the first end of the housing and the primary filtration device, such that first conduit is attached to an inlet and one of the outlets of a pair of outlets of the splitter valve;

a third conduit attached to and extending from the other of the outlets of the pair of outlets, such that the pool can be drained through the third conduit upon opening of the other of the outlets.

\* \* \* \* \*